United States Patent [19]

Cope

[11] 3,726,069
[45] Apr. 3, 1973

[54] PIVOTING DEFLECTOR COMBINATION

[75] Inventor: John M. Cope, Livonia, Mich.

[73] Assignee: Sturdevant Manufacturing Corporation, Livonia, Mich.

[22] Filed: Feb. 28, 1972

[21] Appl. No.: 229,920

[52] U.S. Cl. ................................ 56/202, 56/320.2
[51] Int. Cl. ........................................ A01d 35/22
[58] Field of Search ............... 56/202, 320.2, 255, 56/17.4, 17.5

[56] References Cited

UNITED STATES PATENTS

| | | | |
|---|---|---|---|
| 3,192,692 | 7/1965 | Slemmons | 56/13.4 |
| 3,197,949 | 8/1965 | Waag | 56/202 |
| 3,423,918 | 1/1969 | Siwek | 56/202 |
| 3,624,699 | 11/1971 | Hoffman | 56/202 |
| 3,636,686 | 1/1972 | Meyer et al. | 56/320.2 |
| 3,673,778 | 7/1972 | Ramey | 56/320.2 |

*Primary Examiner*—Russell R. Kinsey
*Attorney*—Benjamin W. Colman

[57] ABSTRACT

A pivoting deflector combination is provided, comprising a deflector, a bracket member, and a collector frame support adapted to be removably secured to the bracket member affixed to the housing of a power lawn mower adjacent the exit end of the discharge chute. The bracket is provided with means for removably securing a bag-type collector of grass cuttings and debris swept up by the rotating blade of the mower, the deflector being maintained out of normal deflecting position while the collector is secured by and upon the bracket. Resilient means biasing the deflector to normal grass deflecting posture and detent means to hold the deflector away from the collector are also provided in the combination.

10 Claims, 10 Drawing Figures

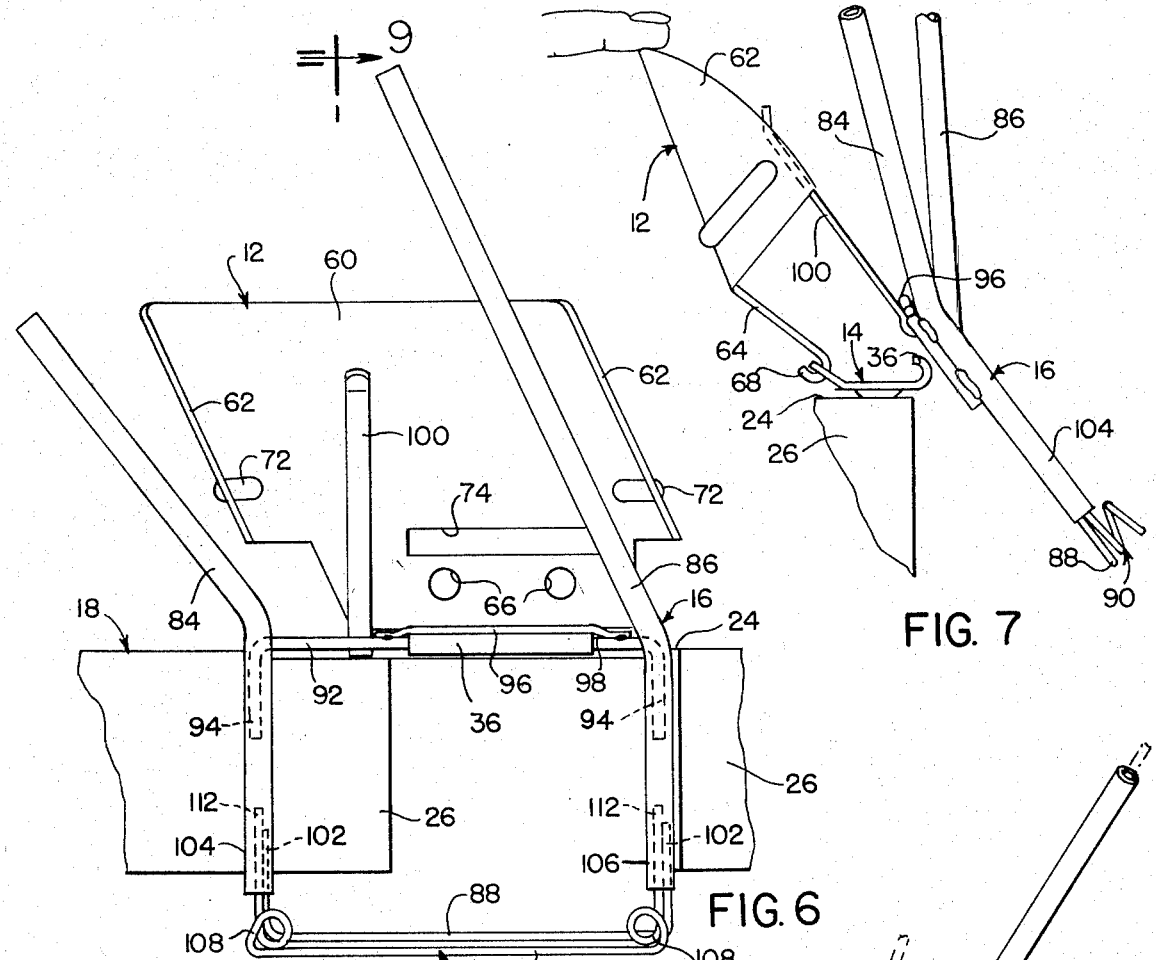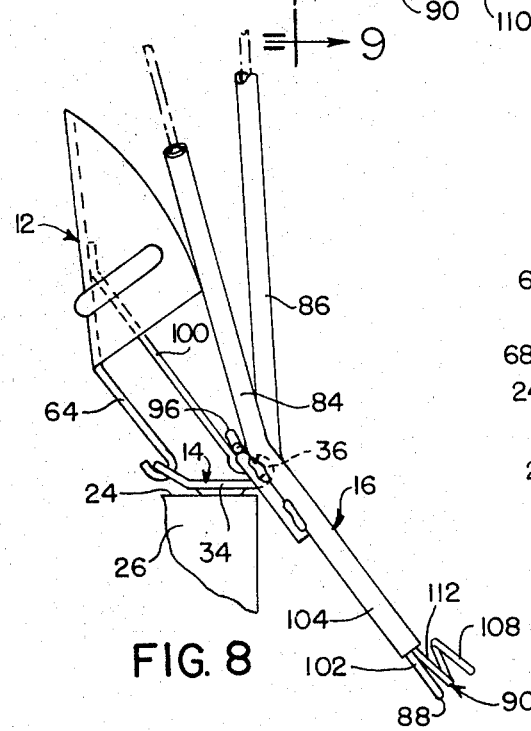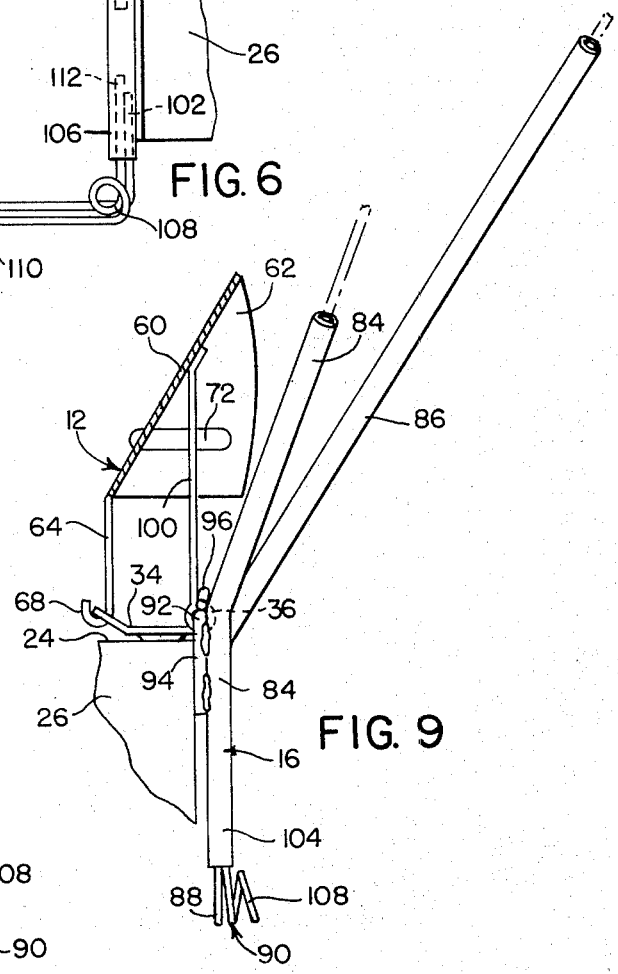

PIVOTING DEFLECTOR COMBINATION

The invention involves a discharge deflector combination adapted to be secured to the housing of a power lawn mower adjacent the discharge end of the housing chute. The combination comprises a pivoting deflector, a bracket member and a collector frame support adapted to be removably secured to the bracket member. The deflector is normally biased to a discharge deflecting posture adjacent the discharge end of the chute by resilient spring means secured to the bracket member and bearing upon a portion of the deflector. The bracket member has a flange portion adapted to engage and secure a portion of the grass cutting collector frame support adjacent the chute edge. This bracket flange portion is exposed for engagement with the collector frame when the deflector is pivoted upwardly and inwardly away from its normal deflecting posture, so that the bag collector can be mounted and secured in grass-cutting receiving position. The deflector is maintained in its elevated posture by a detent bar affixed to the frame support.

The deflector and bracket member are pivotally secured together, the bracket member being affixed to the housing by fasteners passed through openings in the deflector member. The deflector is provided with hinge loops at its rearward edge that pivot about web portions at the rearward edge of the bracket.

The invention provides deflector means for deflecting grass cuttings, stones and debris that are cut and struck by the rotating mower blade, these elements being deflected downwardly toward the ground as the mower is moved across the grass. Simultaneously, the deflector member safeguards the operator's shoes and feet from entering the chute area, where the rotary blade of the mower is revolving at relatively high speeds. When the collector for the grass cuttings and debris is removably secured upon and by the flanged portion of the bracket, to overlie the exposed open end of the mower discharge chute, the operator's shoes and feet are again prevented from entering the chute area, protecting the operator from injury or damage. These features are very important in the safe use and operation of power lawn mowers, which have often occasioned serious injury to operators or persons standing near or walking into the mower while it is in operation.

Heretofore, power lawn mowers have been provided with frame means for attaching bag-type collectors to the mower housing and separate deflector means for deflecting the grass cuttings into windrows. The invention disclosed herein provides a structural combination whereby both desirable results are provided in the combination of elements described and illustrated in this application.

It is therefore an object of the invention to provide a deflector and collector combination for a power lawn mower. Another object is to provide deflector engaged bracket means having a portion thereof adapted to secure and mount a collector frame support for grass cuttings having deflector detent means to maintain the deflector out of engagement with the collector when the latter is supported on the bracket member. A further object is to provide resilient means for biasing the deflector to normal deflecting posture, when the collector is removed from its attachment to the bracket member. Still another object is to provide a relatively inexpensive deflector-collector frame support combination adapted to safeguard the operator and persons in the immediate vicinity of the grass discharge chute from personal injury. Yet a further object is to provide means for safeguarding the operator and others by preventing their entry into the area of the discharge chute and the rotating grass cutting blade, both when the deflector is in its normal deflecting posture as well as when the collector has been engaged upon the bracket member.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a perspective view of a power lawn mower, the handle support members being shown fragmentarily, embodying the deflector and bracket combination of this invention, with the deflector in normal lowered deflecting posture.

Figure 3:
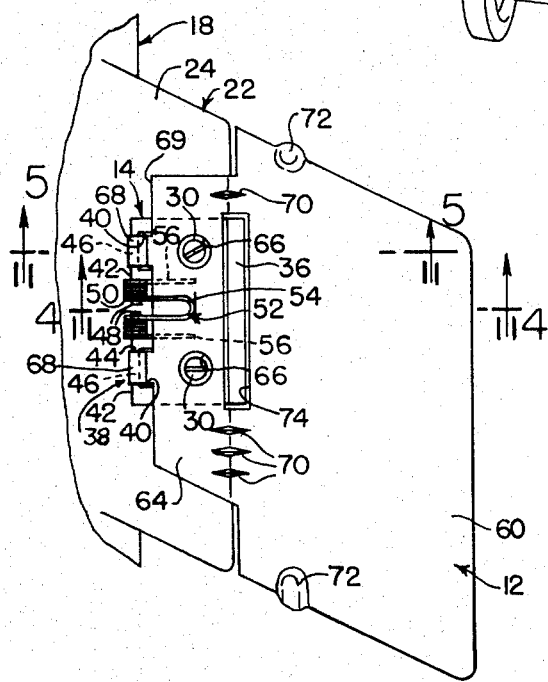
FIG. 3 is a top plan view on an enlarged scale of the deflector and bracket combination as illustrated and taken substantially on the line 3—3 of FIG. 1.
Figure 4:
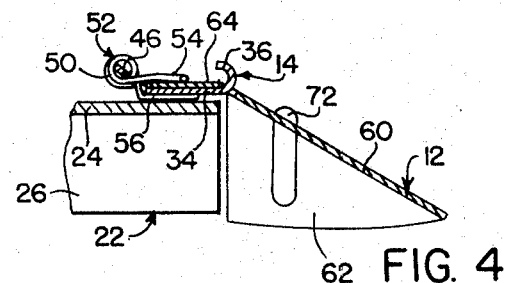
Figure 5:
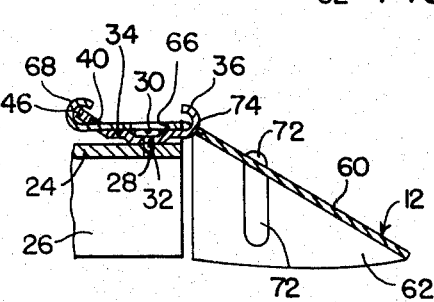

FIGS. 4 and 5 are vertical, transverse sectional views, taken substantially on the lines 4—4 and 5—5 of FIG. 3.

Figure 2:
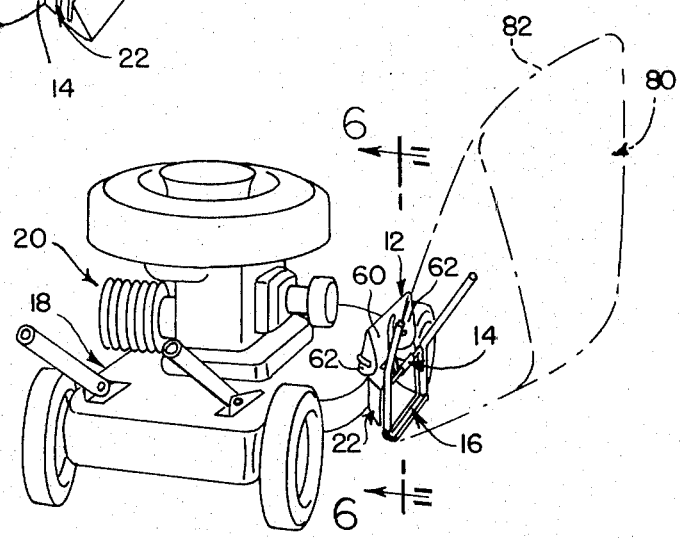
FIG. 2 is a perspective view similar to that illustrated in FIG. 1, showing a bag-type collector secured by its frame support to and upon the bracket member, with the deflector elevated to a position out of contact and maintained out of engagement with the collector by the detent bar affixed to the frame support.

FIG. 6 is a front elevational view on an enlarged scale of the collector support frame secured to the bracket member affixed to the mower housing, taken substantially on the line 6—6 of FIG. 2.

FIG. 7 is a vertical side elevational view of the collector support frame as it is being addressed to the bracket member, with the deflector pivoted away from its normal deflecting posture upon the bracket member.

FIG. 8 is a view similar to FIG. 7, illustrating the support frame approaching its engaging position upon the bracket member at its distal flange.

FIG. 9 is a view similar to FIG. 8 with the support frame engaged by the bracket member flange and pivoted into its collecting attitude, with the support frame detent bar holding the deflector out of contact with and away from the upstanding arms upon which the bag collector is supported.

Figure 10:
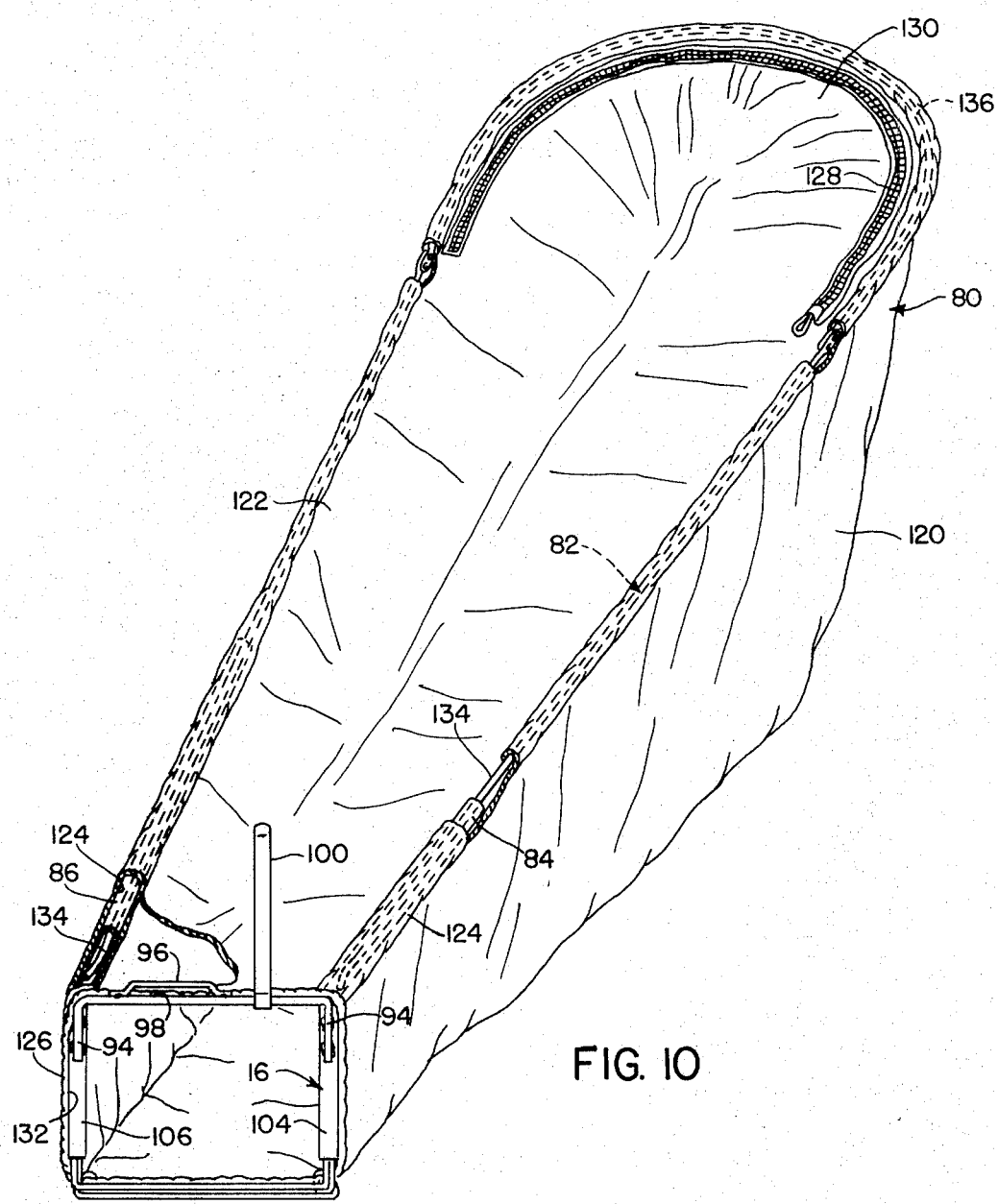

FIG. 10 is an elevational view, apparently in perspective, taken from the distal end of the bag collector mounted upon the support frame illustrated in FIGS. 6–9.

The inventive combination herein disclosed comprises the pivoting deflector 12, the bracket member 14, and the collector frame support 16. The foregoing combination is secured to the rotary blade housing 18 of the power mower 20 adjacent the discharge chute 22. Power mower housings which are not provided with a projecting discharge chute section comparable to that illustrated and disclosed, but merely with a discharge opening in the side of the housing body, can also be arranged to accept the deflector combination of this invention.

The mower discharge chute 22 projects laterally from the housing 18 and comprises a top body or wall portion 24 and lateral depending side walls 26. The top wall 24 is provided with openings 28 therethrough adapted to receive fasteners 30 passed through openings 32 in the bracket member body 34. The fastener openings 28 are spaced apart from each other and adapted to be in register with the spaced apart bracket openings 32. The fastener 30 may be screws as illustrated in FIGS. 3 and 5, or may be combinations of screws and nuts with the shank of the screws passed through the openings 28 for securement by the nut fastener thereunder and upon the chute top wall 24.

Figure 1:
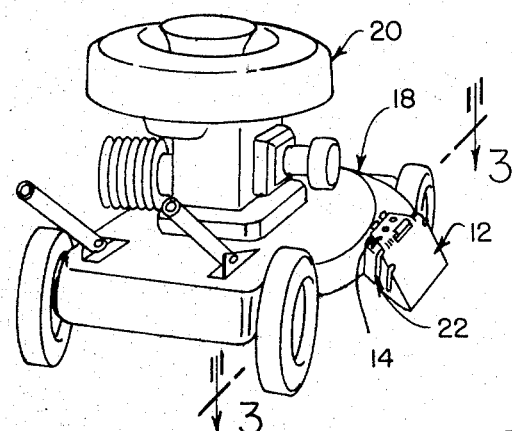

The bracket member 14 comprises the body portion 34, upstanding flange 36 at the forward or distal edge of the body portion and disposed adjacent and substantially parallel to the distal edge of the chute 22, and the deflector connecting portion 38 at the opposite and inward edge of the body. The latter portion 38 is provided with a pair of spaced apart aligned slots 40,40 spaced inwardly from the proximal edges 42,42 to provide a pair of web portions 46,46 adapted to engage hinge portions of the deflector as will be described hereinafter below. These web portions 46,46 each terminate in substantially aligned and opposed laterally extending supports 48,48 adapted to receive the two coils 50,50 of the biasing spring 52 having its looped web end 54 adapted to bear upon the deflector 12, to bias the same to its deflecting posture as illustrated in FIG. 1, and its terminal ends 56,56 disposed below the body portion 34 of the bracket member 14. When affixed to the chute top wall 24, the bracket member body 34 bears firmly upon the spring ends 56,56 to secure them against displacement.

The deflector 12 comprises the main deflector body portion 60 and the integrally formed and connected walls or wings 62,62 at each side of the deflector body and spaced apart so as to come substantially into alignment with the chute side walls 26,26. These lateral wings 62,62 may be further spaced apart and designed to overlie the distal edges of the chute side walls 26, if desired or required. The deflector body portion 60 extends rearwardly and is connected to the proximal body portion 64 which is engaged upon the bracket member web portions 46,46. In normal deflecting posture, the deflector portion 64 rests upon the bracket body 34 and the deflector portion 60 extends downwardly and at an angle substantially in the attitude illustrated in FIGS. 1, 4 and 5.

The deflector body portion 64 is provided with a pair of enlarged openings 66,66 arranged in register with the openings 32 through the body 34 of the bracket member 14, to permit passage of the screws 30 through the deflector portion 64 for affixing the bracket member 14 to the housing body support wall 24 with relative ease, i.e., without requiring that the deflector 12 be pivoted against the biasing pressure of the spring 52 in order to fasten the bracket member 14 to the chute top wall 24. The deflector body portion 64 is further provided with a pair of hinge-type loops 68,68 (FIGS. 3, 4 and 5) that project from its proximal edge 69, to engage upon and pivot about the web portions 46,46 of the bracket member 14. The deflector 12 is also provided with a plurality of stiffening ribs 70 at the bend line between the body portions 60 and 64, and lateral stiffening ribs 72 at the bend line between the body portion 60 and the lateral wings 62,62. To permit the deflector body portion 60 to come into deflecting posture at the chute 22, a slot 74 is provided in the deflector body portion 64 adjacent the bend line between the body portions 60 and 64 so that the bracket member flange portion 36 can pass through the slot 74 to allow the deflector to come to rest upon the bracket member body 34 and into the deflecting posture illustrated in FIGS. 1, 3, 4 and 5.

Once fasteners 30 have secured the bracket member 14 to the top wall 24 of the housing chute 22, the deflector 12 can be pivoted about the hinge web portions 46,46 of the bracket member into an elevated vertical posture against the biasing force of the spring 52, exposing the bracket member frame portion 36 so that it can receive and engage the collector flange support 16 as will be described hereinafter below. Upon disengagement of the frame support, the deflector 12 will return to its normal deflecting posture under the biasing force of the spring 52.

The collector frame support or support frame 16 is removably attachable and secured to and by the bracket member 14, and in turn supports the collector bag 80 which is provided with a tubular or wire frame 82 that expands the bag at its upper surface for more efficient collection of grass cuttings and debris discharged through the chute 22. The frame support 16 is formed as a unitary device and comprises the lateral upstanding tubular arms 84,86, the lower bottom wire frame members 88,90, the upper connector frame web or bar member 92 having depending legs 94,94, each fixedly secured to portions of the upstanding arms 84,86, a detent wire catch bar 96 having its web portion spaced apart and parallel to the web member 92 forming a pocket 98 therebetween and its ends fixedly secured to the web member, by welding or other suitable means, a distance sufficient to allow the bracket flange 36 to pass into the opening 98, and the upstanding deflector detent bar 100 having its proximal end affixed, by welding or other means, to the web member 92. The portions of the upstanding arms 84,86 depending below the bar member 92 are substantially in parallel and spaced apart a distance substantially equal to or slightly greater than the distance between the chute side walls 26,26.

The bottom wire frame member 88 has its ends 102,102 disposed and fixedly secured within the lower end portions 104, 106 of the arms 84,86 respectively. The wire member 90 is provided with relatively open turns 108,108 at each end of its web section 110, the turns terminating in leg portions 112,112 that are disposed and fixedly secured in the lower end portions 104,106 alongside the ends 102,102. The spaced apart frame portions on web sections 88 and 110 provide an open space therebetween to receive the distal bottom edge of the collector bag.

The collector bag 80 comprises a pouch-type collector-container 120 which is provided with a top layer 122 having at its perimeter a tubular portion 124 extending longitudinally of the layer from its distal end where the pouch is provided with an elastic band 126 to its proximal end where the portion 122 is provided with a zipper-type fastener 128 that allows the proximal portion 130 to be opened for release of grass cuttings received within the pouch body during operation of the mower. The tubular section 124 extends longitudinally along one side edge of the layer 122 about the proximal end 130 and down the other longitudinally extending edge back to the elastic band 126 that circumscribes and defines the collector opening 132 adjacent the frame support 16.

The collector 80 further comprises the support rods 134, 134 extending rearwardly from the distal end of the collector toward its proximal end, and the support rod 136 which is connected to the proximal end of the rods 134,134 by suitable fasteners, the support rods 134, 136 and 134 being disposed within the tubular section 124 of the collector pouch.

The frame support 16 is secured to the collector 80 by inserting the distal ends of the framing rods 134,134 into the tubular upstanding arms 84, 86 of the support frame. When the rods 134,134 are inserted to their lower limits, the pouch tubular portion 124 is brought forward upon the upstanding arms 84,86 until the elastic band 126 is disposed adjacent and about the support frame upper web member 92 and the lower bottom wire frame members 88 and 90. The elastic band 126 is then arranged about and to overlie the upper web member, the lower depending portions 104 and 106 of the upstanding arms 84, 86 respectively, and within the open turns 108,108 of the wire frame member 90, to circumscribe the opening provided by the support frame 16 for admission of grass cuttings and debris into the collector pouch 120.

The collector 80 and the support frame 16 when assembled as above described form a unitary device adapted to removably engage the bracket member 14, as will be described hereinafter below.

When the bag collector 80 has been assembled to the support frame 16 as described above, the combination is removably engaged upon the bracket member 14 in the following manner, reference being made particularly to FIGs. 7, 8 and 9 of the drawings. The framed collector is held in and by the right hand, and the hinged deflector panel 60 is raised and pivoted by the left hand to a position substantially as illustrated in FIG. 7. The collector bar member 92 is then brought over the bracket curved flange 36 and lowered to a position upon the bracket body 34 inwardly of the bracket flange 36 (FIG. 80), the detent bar 100 bearing down upon and against the deflector panel 60. The support frame bar member 92 is then brought forwardly upon the bracket body 34 until the curved flange 36 engages and partially encircles the bar member 92 and its distal end is positioned in the opening 98 provided between the bar member 92 and the wire catch bar 96. The support frame 16 is then pivoted upon the flange 36 until it bears against the distal edge of the discharge chute 22 (FIG. 9), the detent bar 100 bearing upon the deflector panel 60 to maintain it out of engagement and away from the collector pouch 120, the upstanding arms 84 and 86 directing the pouch laterally and upwardly away from the open end of the discharge chute 22 (FIG. 22).

To remove the bag collector 80, it is grasped again in the right hand, the deflector 12 is manually pivoted inwardly away from the detent bar 100 and the support frame 16 is again pivoted about and within the flange 36 to the positions illustrated in FIGS. 8 and 7, in an order reverse to that for engagement of the collector 80 upon the bracket member 14. Once the collector 80 and support frame 16 have been disengaged and removed from the bracket member 14, the deflector 12 is pivoted downwardly into deflecting posture, as illustrated in FIGS. 1 and 3, by the biasing force of the spring 52.

Although certain particular embodiments of the invention are herein disclosed for purposes of explanation, further modifications thereof, after study of this specification, will become apparent to those skilled in the art to which the invention pertains. Reference should be had to the appended claims in determining the scope of the invention.

I claim:

1. In a deflector combination for the discharge chute of a lawn mower device at one side of the mower blade housing, the improvement comprising
   a bracket member adapted to be fixedly secured to said housing adjacent said discharge chute,
   fastener means to secure said bracket member to said housing,
   a deflector pivotally secured to and upon said bracket member to substantially surround the open end of said discharge chute when in deflecting posture, and to pivot away from and expose said open end,
   means secured to said bracket member and bearing upon said deflector for resiliently biasing said deflector to deflecting posture at and about said discharge chute,
   and a support frame, for a collector of cuttings and debris discharged from said chute end, removably engageable by and upon said bracket member when said deflector is pivoted away from said open end.

2. The structural combination defined in claim 1, wherein said bracket member comprises a body portion, a flange for removably engaging said collector support frame along its proximal edge, and means for pivotally securing said deflector to said bracket member.

3. The structural combination defined in claim 2, wherein said bracket member flange extends longitudinally of said body portion and is transversely arcuately formed.

4. The structural combination defined in claim 2, wherein said bracket member means to pivotally secure said deflector comprises web portions defining its inward edge,
   said deflector being provided with hinge-type loops along its proximal edge engaged with and pivotable upon said bracket member web portions.

5. The structural combination defined in claim 1, wherein said biasing means comprises a resilient spring structure, said bracket member being provided adjacent its inward edge with a support for said spring structure.

6. The structural combination defined in claim 2, wherein
   said deflector comprises a main deflecting body portion, connected lateral depending side walls, and a proximal body portion,
   said deflector having a slot to receive and allow said bracket member flange to pass therethrough when said deflector is pivoted into deflecting posture, whereby said deflector proximal body portion comes to rest upon said bracket member body portion.

7. The structural combination defined in claim 6, wherein
said deflector proximal body portion is provided with openings to pass said fastener means therethrough for securement of said bracket member to said housing adjacent the distal end of said discharge chute.

8. The structural combination defined in claim 5, wherein said spring structure support comprises a pair of aligned, opposed, spaced apart support members substantially medial longitudinally of said bracket member.

9. The structural combination defined in claim 1, wherein
said collector support frame comprises
an upper connector frame web member adapted to be removably engaged by said bracket member flange.

10. The structural combination defined in claim 9, wherein said upper frame web member is rotatable against and within said arcuate bracket member flange for engagement therewith and removal therefrom of said collector support frame.

* * * * *